United States Patent
Handler et al.

(10) Patent No.: US 11,263,559 B2
(45) Date of Patent: Mar. 1, 2022

(54) SUBSCRIPTION SERVICES WITH EXTENSIONS

(71) Applicant: Inspirato, Denver, CO (US)

(72) Inventors: Brad Handler, Denver, CO (US);
Cody Holloway, Denver, CO (US);
Brent Handler, Englewood, CO (US)

(73) Assignee: Inspirato, Denver, CO (US)

( * ) Notice: Subject to any disclaimer, the term of this patent is extended or adjusted under 35 U.S.C. 154(b) by 141 days.

(21) Appl. No.: 16/667,217

(22) Filed: Oct. 29, 2019

(65) Prior Publication Data

US 2021/0125113 A1 Apr. 29, 2021

(51) Int. Cl.
| | |
|---|---|
| *G06Q 10/02* | (2012.01) |
| *G06Q 50/30* | (2012.01) |
| *G06N 20/00* | (2019.01) |
| *G06F 16/9538* | (2019.01) |
| *G06F 9/451* | (2018.01) |
| *G06N 3/12* | (2006.01) |
| *G06N 5/02* | (2006.01) |
| *G06F 16/9535* | (2019.01) |

(52) U.S. Cl.
CPC ....... *G06Q 10/025* (2013.01); *G06F 16/9535* (2019.01); *G06F 16/9538* (2019.01); *G06N 5/02* (2013.01); *G06N 20/00* (2019.01); *G06Q 50/30* (2013.01); *G06F 9/451* (2018.02); *G06N 3/12* (2013.01)

(58) Field of Classification Search
CPC .. G06Q 10/025; G06Q 50/30; G06F 16/9538; G06F 9/451; G06N 20/00
USPC .......................................................... 705/6
See application file for complete search history.

(56) References Cited

U.S. PATENT DOCUMENTS

| | | | |
|---|---|---|---|
| 2008/0167887 A1* | 7/2008 | Marcken | G06Q 50/14 705/5 |
| 2009/0216633 A1* | 8/2009 | Whitsett | G06Q 30/02 705/14.36 |
| 2017/0213161 A1* | 7/2017 | Moati | G06Q 50/12 |
| 2018/0053264 A1* | 2/2018 | Rowley | G06Q 30/0222 |
| 2018/0225595 A1* | 8/2018 | Zakri | G06F 16/2282 |

(Continued)

OTHER PUBLICATIONS

Ewen, Nick; "What is Starwood Preferred Guest Elite Status Worth in 2018?"; Mar. 18, 2018 (Year: 2018).*

*Primary Examiner* — George Chen
*Assistant Examiner* — Dione N. Simpson
(74) *Attorney, Agent, or Firm* — Schwegman Lundberg & Woessner, P.A.

(57) ABSTRACT

Systems and methods are disclosed for providing a travel based subscription service that includes one or more processors that perform operations comprising: receiving travel information for a subscriber of a travel-based subscription service, the travel information comprising a booking date and a travel date; computing a subscription value for the subscriber based on the travel information; searching a list of travel services that are available on the travel date to identify candidate travel services that correspond to the subscription value, each of the candidate travel services having a predetermined travel duration; receiving input from the subscriber that selects a given travel service from the identified candidate travel services; and in response to receiving the input from the subscriber, presenting an option to extend the predetermined travel duration of the given travel service.

19 Claims, 7 Drawing Sheets

(56) References Cited

U.S. PATENT DOCUMENTS

2020/0027036 A1\* 1/2020 Unnerstall ............ G06Q 20/145
2020/0143611 A1\* 5/2020 Shin ..................... G07C 9/0073

\* cited by examiner

Travel From 12/22-12/28 — 501

Hi Julie, thank you for selecting Miami/South Beach, Florida resort — 510

Included in your subscription is a 5-day stay at this travel service, would you like to stay longer for an additional $245 per day?

Extend — 514

Overview  Accommodations  Reviews — 502

Accommodation
☐ Homes
☐ Rooms/Suites

Bedrooms
☐ 1 Bedroom (6)
☐ 2 Bedrooms (2)
☐ 3 Bedrooms (3)

Amenities            clear
☐ Air Conditioning (11)
☐ Beach Access Within Walking Distance (11)
☐ Children's Programs (3)
☐ Dining within Walking Distance (11)
☐ Fitness Center On Site (8)

11 Accommodations — 503

Miami/South Beach, Florida — 520
3 Room/Suites worth $3500

1 Hotel south Beach
Miami/South Beach, Florida

Miami/South Beach, Florida

FIG. 5

SUBSCRIPTION SERVICES WITH EXTENSIONS

BACKGROUND

Web-based travel services systems allow a user to search through various travel services available by multiple providers. A user can specify a destination and travel time frame to find matching hotels, rental cars, and airfares along with their corresponding costs. The user can sort the results by price, type and availability of the travel service. After the user finds a suitable hotel, rental car, or airfare, the user can utilize the web-based travel services to reserve the hotel, rental car, or airfare.

BRIEF DESCRIPTION OF THE DRAWINGS

Various ones of the appended drawings merely illustrate example embodiments of the present disclosure and should not be considered as limiting its scope.

FIG. 5 is an illustrative graphical user interface of the travel services system, according to some example embodiments.

DETAILED DESCRIPTION

Figure 1:
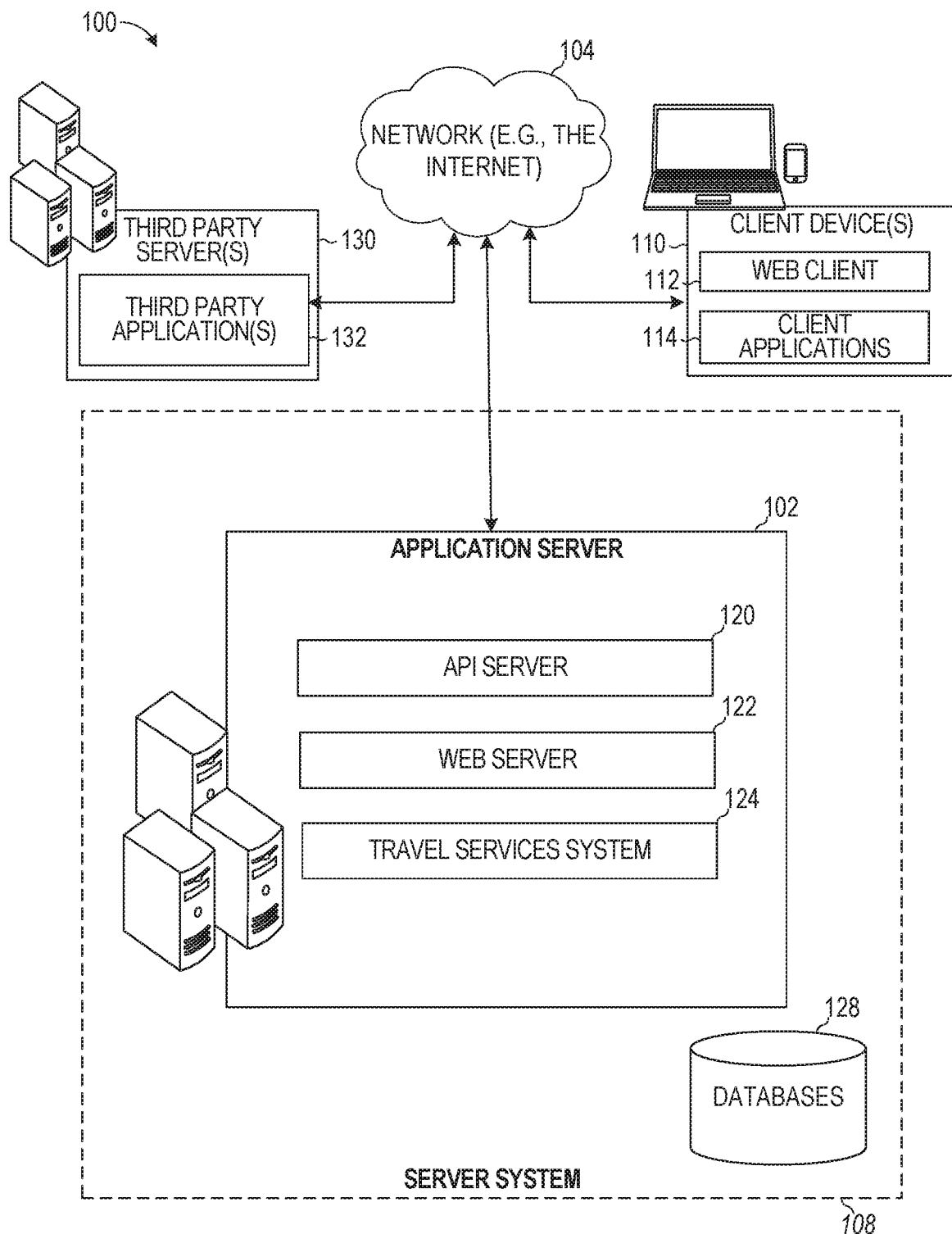
FIG. 1 is a block diagram illustrating a networked system for a subscription-based travel service, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Users typically spend a great deal of time and effort making travel arrangements, such as looking for hotels, airfares, and car rentals that are within their budget. Existing travel sites allow a user to input various travel criteria, such as travel dates and destinations, to search for all the available hotels, airfares, and car rentals that match the travel criteria. The existing travel sites also allow the user to sort and filter results based on a specified cost. While such existing travel sites generally work well for making travel arrangements, there is often a large disparity between cost and availability for the same or similar hotels, airfares, and car rentals across different travel sites. This ends up burdening the user as the user has to search through the available options across multiple travel sites to make sure he or she gets the best price within their budget. Searching through multiple travel sites takes a great deal of time and effort and forces the user to navigate through multiple pages of information and manually compare results to make travel arrangements. Even still, the travel arrangements the user finally settles on may not provide the user with the best available options for their budget.

In addition, once a user finally finds a desired travel service, reserving the travel service requires the user to complete a checkout process by navigating through many checkout screens. For example, the user has to first select the desired travel service, then input various personal information on another screen, then navigate to a payment screen to provide payment information, and finally, the user can confirm reservation for the desired travel service in a confirmation screen. This further adds to the inefficient use of system resources for making travel service reservations using traditional systems and further wastes a user's time and effort.

The typical travel sites blindly aggregate or search through all of the available travel options across numerous websites of hotels, airlines and car rental companies to generate as many different combinations as possible of travel options. This type of aggregation consumes a great deal of system processing and storage resources and substantially burdens networks and consumes bandwidth that can otherwise be used for other tasks. To address some of these issues, certain organizations install additional dedicated servers or services, which ends up being costly and inefficient. Rather than aggregating blindly all of the available travel options, some travel sites perform a search across millions of different travel service options based on user supplied criteria. Such searches take a great deal of time and also consume a tremendous amount of system processing and storage resources. Because of the amount of time these searches take to complete, users end up either leaving the system altogether or being frustrated at the end result and may end up not making any travel reservations at all.

Some subscription-based travel services address the above issues and expedite presentation of travel service options by pre-aggregating in an intelligent way various combinations of travel services based on a given set of factors. However, such travel services systems present users with travel service options that have fixed or predetermined durations which may not match the needs of most users. Namely, users may desire to travel for a longer period of time than that offered by such systems but may not be able to make such reservations because of the fixed durations that such travel services offer.

The disclosed embodiments improve the efficiency of using an electronic device by providing an improved way to offer more travel flexibility to users of a subscription-based travel services system, providing a better way for users to conduct travel. The subscription-based travel service, according to the disclosed embodiments, allows a user to search for travel services and make reservations for travel services (e.g., such as hotels, rental cars, airfares, homes/residences, experiential travel, guided tours, cruises, train fares, private aviation, "glamping," bespoke travel, event-based travel, and/or space travel) for a fixed annual or monthly subscription fee. The disclosed subscription-based travel service pre-aggregates various combinations of travel service options based on a given set of factors including a subscription value computed for individual users. The user who is a subscriber to the subscription-based travel service is authorized to make an unlimited number of reservations for travel services without having to consider budgetary constraints and can search through the travel services very quickly with minimal delay. While certain embodiments are described with reference to travel services, similar functionality can be applied to sporting event tickets, event tickets, concert tickets, entertainment tickets and restaurant reservations. In such cases, a subscription service can be provided that allows a user to pay a monthly or annual subscription fee and make an unlimited number of reservations for sporting event tickets, event tickets, entertainment tickets, concert tickets, and restaurant reservations without having to consider budgetary constraints.

The travel service automatically identifies, curates, and generates a predetermined list of all of the best available travel service options for a specified travel period and destinations from which the user can select based on the user's subscription value. Each travel service option may correspond to a given travel service that is associated with a fixed or predetermined travel duration, such as three- or five-day stays at a hotel. To provide the user with additional flexibility in making travel reservations using the subscription-based travel services system, an option for one or more for the listed travel services is provided that allows the user to extend the fixed travel duration of a given travel service. As such, rather than being limited to the fixed duration of a given travel service, the user can choose to add one or more days to the given travel service (e.g., for an additional fee). In some cases, the additional fee is determined based on the cost non-subscribers of the travel services system incur for reserving or consuming the given travel service. Reserving a desired travel service with or without extending the predetermined duration can be performed very quickly and efficiently by selection of a reservation option. Reserving the desired travel service with or without extending the duration can be performed without navigating through multiple checkout and payment screens as the payment and user information needed to reserve the travel service is performed using the subscription information and subscription payments the subscriber makes. Specifically, the disclosed embodiments, store ahead of time various personal information about a user in a user profile and receive subscription payments from the subscribers. In this way, the disclosed embodiments can very quickly automatically reserve and pay for a user selected travel service using the previously stored personal information and the previously provided subscription payments avoiding the need to navigate the user through a checkout process.

In this way, the amount of time and effort the user has to spend searching for travel services that meet the user's budget and reserving such travel services are significantly reduced. In addition, because the travel service options are pre-aggregated based on various factors, system resources are used more efficiently than with traditional travel service systems. Also, by providing a single interface and travel site for making travel arrangements that automatically take into account various travel service costs in providing travel services options to the user and that store ahead of time personal user information and receive subscription payments, the number of steps, pages, and interfaces the user has to navigate through to make travel arrangements are reduced. This provides a better way for a user to consume travel. Namely, the user does not need to search through multiple travel sites and pages of information to find travel arrangements that satisfy the user's needs.

FIG. 1 is a block diagram illustrating a networked system 100 for a subscription-based travel service, according to some example embodiments. The system 100 includes one or more client devices such as client device 110. The client device 110 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 comprises a display module to display information (e.g., in the form of graphical user interfaces). In further embodiments, the client device 110 comprises one or more of touch screens, accelerometers, gyroscopes, cameras, microphones, global positioning system (GPS) devices, and so forth. The client device 110 may be a device of a user that is used to access and utilize subscription-based travel services via a travel services system 124 implemented by an application server 102.

For example, the client device 110 may be used by a user to navigate to a website of the travel services system 124. In some embodiments, the client device 110 may include a dedicated travel services system 124 application with the same or similar functionality as the website. After accessing the website or the application on the client device 110, the user inputs personal information (e.g., name, address, phone number, payment information, geographical location, home address, and so forth) to access the travel services system 124.

In some embodiments, access to the travel services system 124 requires a subscription fee to be paid. The subscription fee is paid monthly but can be paid on any other periodic or non-periodic interval (e.g., weekly, daily, every other month, annually, lifetime, and so forth). After subscribing to the travel services system 124 by paying a periodic subscription fee, the user is provided with login credentials that can be used to navigate and browse available travel services on the travel services system 124 and reserve or book travel services. For example, the user can access the travel services system 124 to browse hotel rooms available in various luxury categories in a selected geographical location on a particular date or range of dates. The travel services are pre-aggregated (e.g., the combinations of travel services are created before user search criteria is received) and the user searches through the pre-aggregated travel services. This reduces the amount of system resources required to find travel services that meet user search criteria and expedite presentation of results. Also, the pre-aggregated travel services are associated with costs that may be lower than the off-the-shelf cost of purchasing such travel services ad hoc. Namely, because the user is limited to searching through pre-determined combinations of travel services on the subscription-based travel service, such travel services can be provided at a lower cost than if the user were to search for the same travel services and make their own combination using a non-subscription based traditional travel site.

In some embodiments, after the user activates their subscription, the client device 110 presents a graphical user interface with data entry regions allowing the user to select from a predefined list of travel destinations (e.g., at various geographical locations) available on a travel date input by the user. The graphical user interface allows the user to manually type in a name of a desired geographical location destination and the desired travel date (e.g., the date the user plans to take the trip and consume the travel service and/or the length of time for the trip). As the user types in the name of the desired geographical location destination, the travel services system 124 searches through the predetermined combinations of travel destinations available on the travel date that are at the desired geographical location(s) and presents the available travel destinations to the user for selection. In some cases, the list of travel services that are presented to the user are selected based on a likelihood that the user will consume (e.g., reserve or book) the travel services.

In response to receiving a user selection of one or more of the travel destinations, prior to or during selection of the destination, the client device 110 presents a data entry region for the user to input a specific travel start date (e.g., an arrival date at the hotel) and a number of days for the trip. In some embodiments, the list of available travel services is automatically searched for on a daily basis without receiving the user selection of the travel destination and/or travel start date. The travel services system 124 retrieves subscription information for the user specifying the amount the user pays on a monthly or other periodic basis. Using the subscription information, the travel services system 124 computes one or more subscription values as a function of the booking date and the travel date. The booking date may be computed based on the current date on which the user selection of the travel destination is received and/or the current date on which a list of travel services is searched and curated.

The travel services system 124 utilizes the subscription value and a value guard to search for travel services that satisfy the subscription value and the value guard. The value guard is used as a filter of travel services to ensure that the travel service options presented to the user have a cost and/or value that satisfies a minimum travel value amount and does not exceed a maximum purchase amount corresponding to the estimated or computed subscription value.

After activating the subscription to the travel services system 124, the travel services system 124 provides matching travel services results to the client device 110 for presentation in the graphical user interface using one or more interactive visual representations. The graphical user interface of the client device 110 may be utilized to access reviews, comments, and additional information for each of the travel services represented by the interactive visual representations.

The client device 110 receives a user input selecting one of the interactive visual representations for a travel service and communicates the selection to the travel services system 124. The travel services system 124 automatically reserves the travel service (e.g., holds and pays for a room at a hotel) corresponding to the selected interactive visual representation. The client device 110 may present a confirmation page to the user informing the user of the travel service that has been reserved and the travel start date.

In some implementations, the travel services system 124 may limit the number of concurrent travel services the user can reserve. For example, the travel services system 124 may allow the user to select only one travel service reservation at a time, such that the user is prevented from searching for and/or reserving additional travel services until the currently selected travel service that has been reserved expires or is canceled. As another example, the travel services system 124 may only allow the user to reserve three travel services at a time, such that when one of the three travel services expires, the user can reserve an additional travel service. Namely, after the start and end dates for the travel service elapse indicating that the user has utilized the travel service, the client device 110 may allow the user to search for additional travel services to reserve in a similar manner as before if the user's subscription is still active. Alternatively, the user can navigate to a cancelation page or graphical user interface using the client device 110 and cancel any reservations previously selected within a cancelation window (e.g., within 72 hours prior to the travel start date). In response to receiving a user request to cancel the travel service, the travel services system 124 may cancel the reservation and the client device 110 may allow the user to search for and reserve a new travel service in a similar manner as before.

In some embodiments, the travel services system 124 provides an improved way to allow users to make travel reservations using a subscription-based travel system. The travel services system 124 performs such improved techniques in various phases or steps. Initially, the travel services system 124 generates an inventory of travel services by searching travel destinations across a range of dates or specific dates throughout the year between the start and end dates of a user's subscription. The travel destinations are searched from publicly available information sources (e.g., databases of other travel sites available to non-subscribers of the travel services system 124), by direct access to a predetermined set of travel services, third party sources, proprietary sources, and travel services that have direct relationships and contracts for travel services with the travel services system 124. The travel destinations are searched periodically (e.g., nightly or weekly) using various combinations of travel dates and destinations. The search returns a predetermined list of travel services available at various dates throughout the world and includes the total cost for consuming the travel services on the particular combination of dates along with the cancelation policy of each travel service. The cancelation policy may indicate the fee for canceling the travel service once booked which may be free or a nominal charge. As a result, the output of phase one or step one is a collection or database of tens of millions of combinations of travel services (and travel service types), at different ranges of travel start dates, with corresponding prices or costs, and with corresponding cancelation policies. In an embodiment, each travel service is associated with a second cost that represents the cost incurred by the travel services system 124 to reserve the travel service. This second cost can be pre-negotiated between each travel service and the travel services system 124. The second cost may or may not be presented to users of the travel services system 124. Each travel service may also be associated with a first cost that represents the off-the-shelf cost for reserving the travel service using traditional methods. Namely, the first cost represents the price non-subscribers of the travel services system 124 pay for consuming the travel service by, for example, directly purchasing the travel service or reserving the travel service with the provider of the travel service (e.g., making the reservation for the hotel using the hotel website). In some implementations, the first cost is higher than the second cost. As a result, subscribers of the travel services system 124 can benefit from lower cost travel services as the travel services system 124 can offer various travel services at a cost greater than the second cost but lower than the first cost of each travel service.

In the next step or phase, the collection of the travel services identified in the previous phase is curated or filtered in accordance with one or more rules. Specifically, any, all, or a combination of the information associated with each travel service (e.g., the travel start dates, the prices, the travel service type, the destination, the transportation criteria, and the cancelation policy) is analyzed and compared with the one or more rules to exclude and select a list of candidate travel services. In an embodiment, the rules include various criteria (e.g., the booking date or date on which the reservation for a given travel service is made or requested and/or the price with taxes and fees (cost of the reservation)), which are used to curate or filter the collection of travel services. The rules may vary between users of the travel services system 124 as different users are in geographically disparate locations.

Specifically, the rules consider how much the travel services system 124 is willing or allowed to spend (e.g., the maximum purchase amount) for a given travel service, relative to the first or second cost of the given travel service, which is leveraged against how far in advance the reservation is being made (e.g., the difference between the booking date and the travel start date). The maximum purchase amount may be computed based on various factors including payments received (e.g., the amount a subscriber will actually end up paying from the booking date to the travel date and an amortized amount by week of the subscriber's subscription cost). Namely, a maximum purchase amount may be computed to be used as a basis for filtering the travel services based on cost.

In some cases, the amount the subscriber will actually end up paying may be computed by determining how many subscription cycles or how many payments will be collected between the booking date and the travel start date. For example, a subscriber may have a subscription that is activated on the first of the month and may be determined to have an estimated monthly cost that is paid on a first day of every month. The booking date may be in the middle of a given month and the travel start date is two months from the booking date. In such cases, the subscriber will pay two cycles of subscription fees—two monthly payments—by the time the trip starts. The amortized amount is less granular and represents on a repeated time interval (e.g., daily, monthly, weekly, hourly) basis how much the subscriber pays. The maximum purchase amount is then offset by a margin (weight) which may be positive or negative. The margin (weight) may vary based on how far in advance the reservation is being made (e.g., the difference between the booking date and the travel start date). The margin may vary based on the type of travel service being booked or reserved. For example, the margin may be greater for travel services that include or relate to cruises and smaller for travel services that include or relate to homes/residences.

The travel services system 124 computes a minimum travel value representing the maximum a given user would be willing to pay for the travel service. This may be computed as a percentage (e.g., 80%) of the amount the subscriber will pay by the time the trip begins. Specifically, the amount is a percentage of the number of subscription cycle payments the subscriber will make by the travel start date, starting from the booking date. This amount is used to remove any travel services that have a first cost (e.g., cost available to non-subscribers of the travel services system 124) that is less than the minimum travel value as the subscriber can shop those travel services independently of being a subscriber to the travel services system 124. The travel services system 124 eliminates any duplicates from the travel services and maintains those travel services that have a maximum duration of travel dates. For example, if the travel services system 124 identifies the same hotel having 2, 3 and 5 night stay options in the same time period, the travel services system 124 selects only the five-night option and removes or filters out the two- and three-night stay options during the same time period.

The travel services system 124 searches the actual price or second cost of the various travel services and applies a margin to the second cost of each travel service. The margin may be positive or negative and may depend on how far in advance the travel date is relative to the booking date. The travel services system 124 filters any travel service that has a second cost (e.g., cost incurred to make the reservation by the travel services system 124) that exceeds the maximum purchase amount and filters any travel service that has a first cost (e.g., cost available to non-subscribers of the travel services system 124) that is below the minimum travel value. The travel services system 124 applies an additional filter based on cancelation policies of travel services that do not satisfy a given cancelation policy criteria.

In some embodiments, the travel services system 124 presents the filtered list of travel services as options for the user or subscriber to select to make a reservation. The user can further filter the list based on various criteria (e.g., travel dates, travel destinations, etc.). In some embodiments, the travel services system 124 presents to a user a comparison of each travel service that is presented against what is available for the same travel service on a publicly available or other travel site. Specifically, the travel services system 124 presents, next to each travel service or next to a portion of travel services, an identification of another booking travel site that has the same travel service and the first cost for booking that same travel service on the other booking travel site. This first cost that is presented for comparison may be retrieved from storage based on what is in the collection that is analyzed and filtered to generate the list and/or may be determined automatically by accessing the other travel site, executing a search for the particular travel service and the particular range of travel dates, and retrieving the cost presented on the other travel site based on the executed search.

In some embodiments, each travel service that is presented to the user is associated with a respective travel duration. For example, a given travel service may correspond to a 5-night hotel stay in which case the travel duration is 5 nights. The travel duration of each travel service may differ based on various factors including the second costs of the respective travel service. For example, a first travel service that is associated with a second cost that is greater than the second cost associated with a second travel service may have a shorter travel duration than the travel duration of the second travel service. In some cases, the travel services system 124 adds more flexibility for the subscriber to make travel reservations by presenting an option to extend the travel duration of a given travel service. This option may be provided for each travel service that is presented to the user or for a selected subset of the travel services. In some cases, the option to extend may be presented for travel services that are of a first type and may be excluded for travel services that are of a second type. For example, travel services that are hotel stays may be provided with the option to extend while travel services that are cruises may not be provided with an option to extend.

In some embodiments, the option to extend may be associated with a particular fee. The fee associated with the option to extend may be computed based on the first cost of the given travel service. For example, the travel services system 124 may retrieve the first cost of a given travel service representing the cost per day, week, month or other specified interval that a non-subscriber of the travel services system 124 pays to reserve or consume the given travel service. In some cases, the travel services system 124 accesses a website associated with the travel service to retrieve the first cost for the date(s) on which the subscriber plans to consume the travel service. As an example, a subscriber may desire to book a hotel stay at a given hotel between December 4-December 11 and the travel services system 124 provides the user with the option to reserve the given hotel for a predetermined duration of 5 nights (e.g., between December 4-December 8). The travel services system 124 may access a website of the given hotel to retrieve the first cost of reserving the hotel between December 8-December 11 (e.g., the period of time following the predetermined duration). The travel services system 124 presents the option to the subscriber to extend the duration of the given hotel stay for an additional fee (computed based on the first cost retrieved from the website of the given hotel), the additional fee being additional to the monthly subscription cost of the user. If the user selects the option, the travel services system 124 charges the user the fee (the first cost or an amount greater than the first cost by some margin), and reserves the stay at the given hotel between December 4-December 11. To do so, the travel services system 124 uses the predetermined travel service that is stored and available for reservation using the travel services system 124 at the second cost and automatically communicates with the website for the given hotel to reserve the balance of nights at the retrieved first cost.

As another example, a subscriber may desire to book a hotel stay at a given hotel between December 4-December 11 and the travel services system 124 provides the user with the option to reserve the given hotel for a predetermined duration (e.g., between December 7-December 11). The travel services system 124 may access a website of the given hotel to retrieve the first cost of reserving the hotel between December 4-December 7 (e.g., the period of time preceding the predetermined duration). The travel services system 124 presents the option to the subscriber to extend the duration of the given hotel stay for a fee corresponding to and computed based on the first cost retrieved from the website of the given hotel. If the user selects the option, the travel services system 124 charges the user the fee (the retrieved cost or an amount greater than the first cost by some margin), and reserves the stay at the given hotel between December 4-December 11. To do so, the travel services system 124 uses the predetermined travel service that is stored and available for reservation using the travel services system 124 at the second cost and automatically communicates with the website for the given hotel to reserve the balance of nights at the retrieved first cost.

As another example, a subscriber may desire to book a hotel stay at a given hotel between December 4-December 11 and the travel services system 124 provides the user with the option to reserve the given hotel for a predetermined duration (e.g., between December 7-December 10). The travel services system 124 may access a website of the given hotel to retrieve the first cost of reserving the hotel between December 4-December 7 (e.g., the period of time preceding the predetermined duration) and between December 10-December 11 (e.g., the period of time following the predetermined duration). The travel services system 124 presents a single option to the subscriber to extend the duration of the given hotel stay for a fee computed based on the first cost retrieved from the website of the given hotel for both the period of time preceding and following the predetermined duration. Alternatively, the travel services system 124 presents two options to the subscriber: a first option to extend the duration of the given hotel stay at a first fee computed based on the first cost retrieved from the website of the given hotel for the period of time preceding the predetermined duration; and a second option to extend the duration of the given hotel stay at a fee computed based on the first cost retrieved from the website of the given hotel for the period of time following the predetermined duration. Each of the first and second options may be associated with a different fee. If the user selects the single option, and the first and/or second options, the travel services system 124 charges the user the fee associated with the selected option, and reserves the stay at the given hotel between December 4-December 11. To do so, the travel services system 124 uses the predetermined travel service that is stored and available for reservation using the travel services system 124 at the second cost and automatically communicates with the website for the given hotel to reserve the balance of nights at the retrieved first cost.

In some embodiments, the travel services system 124 may present or exclude the option to extend a given travel service based on whether the travel duration requested by a user exceeds the predetermined travel duration of the given travel service by more than a threshold amount. For example, a subscriber may desire to book a hotel stay at a given hotel between December 4-December 12 and the travel services system 124 provides the user with the option to reserve the given hotel for a predetermined duration (e.g., between December 4-December 9). In such cases, the travel services system 124 determines that the travel duration requested by the user is 8 nights (e.g., the period of time between December 4 and December 12). The travel services system 124 determines that the predetermined duration for the given hotel is 5 nights. The travel services system 124 compares the requested travel duration of 8 nights to the predetermined duration of 5 nights and determines that the difference is 3 nights. The travel services system 124 retrieves a threshold from memory. The threshold may be 2 nights. The travel services system 124 compares the difference of 3 nights to the threshold of 2 nights, and in response to determining that the difference exceeds the threshold, the travel services system 124 retrieves the first cost for the additional 3 nights to present the option to extend to the user.

As another example, a subscriber may desire to book a hotel stay at a given hotel between December 4-December 12 and the travel services system 124 provides the user with the option to reserve the given hotel for a predetermined duration (e.g., between December 4-December 9). In such cases, the travel services system 124 determines that the travel duration requested by the user is 8 nights (e.g., the period of time between December 4 and December 12). The travel services system 124 determines that the predetermined duration for the given hotel is 5 nights. The travel services system 124 compares the requested travel duration of 8 nights to the predetermined duration of 5 nights and determines that the difference is 3 nights. The travel services system 124 retrieves a threshold from memory. The threshold may be 4 nights. The travel services system 124 compares the difference of 3 nights to the threshold of 4 nights and in response to determining that the difference fails to exceed the threshold, the travel services system 124 does not present the option to extend to the user.

In some cases, the threshold to control whether to present or not to present an option to extend may be dynamically determined based on a classification of the user. For example, the travel services system 124 may compute a lower threshold value for a very active user (e.g., a user who makes more than two reservations for travel services per month) than the threshold value computed for a non-active user (e.g., a user who makes less than two reservations for travel services per month). In some cases, the classification is automatically determined (e.g., using a machine learning model). In some cases, the classification is manually input by the user. In some cases, the threshold may be user specified.

In some embodiments, the travel services system 124 may present or exclude the option to extend a given travel service based on whether the first cost to extend the travel duration is less than a threshold. For example, a subscriber may desire to book a hotel stay at a given hotel between December 4-December 12 and the travel services system 124 provides the user with the option to reserve the given hotel for a predetermined duration (e.g., between December 4-December 9). In such cases, the travel services system 124 determines that the first cost to extend the predetermined duration for the additional three nights (e.g., between December 9-December 12) is $900 (or $300 per night). The travel services system 124 retrieves a threshold from memory. The threshold may be $1000. The travel services system 124 compares the cost to extend the predetermined duration by 3 nights (e.g., $900) to the threshold (e.g., $1000) and in response to determining that the cost to extend is less than the threshold, the travel services system 124 presents the option to extend to the user. In some cases, the threshold may be set by a subscriber. In some cases, the threshold may be determined based on the amount a given subscriber pays per month to subscribe to the travel services system 124. In this way, different subscribers may be presented or not presented with options to extend based on their profiles and subscription types or classifications.

One or more users may be a person, a machine, or other means of interacting with the client device 110. In example embodiments, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via a network 104. In this instance, the other entities in the system 100, in response to receiving the input from the user, may communicate information to the client device 110 via the network 104 to be presented to the user. In this way, the user interacts with the various entities in the system 100 using the client device 110.

The system 100 further includes a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, an online home buying and selling application, a travel services application, a real estate application, and the like.

In some embodiments, one or more client applications 114 are included in a given one of the client device 110 and configured to locally provide the user interface and at least some of the functionalities, with the client application 114 configured to communicate with other entities in the system 100 (e.g., third-party servers 130, server system 108, etc.), on an as-needed basis, for data and/or processing capabilities not locally available (e.g., to access location information, to access travel services information, such as cost and availability, to authenticate a user, to verify a method of payment, etc.). Conversely, one or more applications 114 may not be included in the client device 110, and then the client device 110 may use its web browser to access the one or more applications hosted on other entities in the system 100 (e.g., third-party servers 130, server system 108, etc.).

A server system 108 provides server-side functionality via the network 104 (e.g., the Internet or WAN) to one or more third-party servers 130 and/or one or more client devices 110. The server system 108 includes an application server 102 that implements an application program interface (API) server 120, a web server 122, and a travel services system 124, that may be communicatively coupled with one or more databases 128. The one or more databases 128 may be storage devices that store data related to users of the system 108, applications associated with the system 108, cloud services, travel services data, one or more machine learning techniques and so forth. The one or more databases 128 may further store information related to third-party servers 130, third-party applications 132, client devices 110, client applications 114, users, and so forth. In one example, the one or more databases 128 may be cloud-based storage.

In one example, the one or more databases 128 may be cloud-based storage. The one or more databases 128 may store subscription information for one or more users of the travel services system 124. The subscription information may identify users of the travel services system 124, the subscription start dates of the users, the subscription end dates, the subscription fee of the users, the geographical locations of the users, the total amount paid-to-date for a subscription of the users, and/or one or more travel services activities of the users. The travel services activities may include any combination of the number of reservations made in a given time period (e.g., within a given subscription year) by each user, the subscription duration (e.g., measured from the subscription start date to the present date) of each user, the booking duration (e.g., measured from the booking date to the travel date) of each user, the distance to the travel destination of each user (e.g., measured from an address of the user and the location of reserved travel destinations), the margin amount (e.g., how much profit was made in aggregate during the course of the subscription) for each user, the cancelation frequency (e.g., how often the user cancels a reservation made), and/or the reservation frequency (e.g., how much time elapses on average between the end of one reservation and the start of another).

The one or more databases 128 may store the reservations (e.g., the destination and the travel start date and/or duration) of travel services of each user or subscriber of the travel services system 124. The one or more databases 128 may store a list of all the available, or a selected set, of travel services in one or more geographical regions or destinations along with reviews and/or detailed information about the travel services. The one or more databases 128 may store the first and second costs on a nightly basis or on some other periodic interval (e.g., per 6 night basis) for each travel service. As referred to herein, the first cost that is stored in the one or more databases 128 may represent the cost for the travel service that is provided to non-subscribers of the travel services system 124 and is available by directly making the reservation through a dedicated server of the travel service and/or by making the reservation through an existing travel service search interface. The one or more databases 128 may access a dedicated existing travel service search interface on a periodic basis (e.g., nightly or weekly) to obtain and download the first cost of each, or a selected set, of travel services. The first cost may be computed by selecting a specified travel duration (e.g., 6 nights) and multiplying the per night rate (provided by the travel service) by the specified travel duration. As referred to herein, the second cost of each travel service may be a dedicated, pre-negotiated cost that is changed on an annual or monthly basis and is provided by contract between the travel services system 124 and the corresponding travel service. Reserving a travel service at the second cost may only be available to users who subscribe to the travel services system 124. The second cost of each travel service may represent the cost for consuming the travel service during a specified travel duration (e.g., 6 nights).

The one or more databases 128 may store the cancelation policy of each travel service indicating how much time in advance of the reservation start date at a given travel service the travel service reservation can be canceled without penalty (e.g., to receive a full refund). The one or more databases 128 may store the cost for canceling a given travel service outside of the cancelation policy. The one or more databases 128 may store an expected margin on a per user basis. The expected margin may increase over time (e.g., for subscribers classified as very active) or decrease over time (e.g., for subscribers classified as not very active). The expected margin may increase or decrease based on the subscription type of a given user. The expected margin may change by a predetermined factor based on a difference between a booking date and a travel start date (e.g., the margin may change based on how far in advance a user is making the reservation). This may be used to reduce the maximum purchase amount by a first factor if the reservation is made less than a predetermined number of days in advance of the travel date. This may be used to increase the maximum purchase amount by a second factor if the reservation is made more than a predetermined number of days in advance of the travel date.

The server system 108 may be a cloud computing environment, according to some example embodiments. The server system 108, and any servers associated with the server system 108, may be associated with a cloud-based application, in one example embodiment.

The server system 108 includes a travel services system 124. The travel services system 124 includes one or more modules, storage devices, and databases. The storage devices in the travel services system 124 store various travel services activities for each user, travel services activities training data, and one or more machine learning techniques for classifying users of the travel services system 124. The modules in travel services system 124 are configured to compute components of a subscription value, compute value guards, and search for available travel services to provide to the client device 110 in response to receiving a request for travel services at a given destination and time frame. The modules in travel services system 124 are configured to receive a user selection of one of the travel services matching the request and reserve the selected travel service for the user. The modules in travel services system 124 are configured to determine whether the number of pending reservations for a given user exceeds an allowable number of pending reservations (e.g., more than one, or more than three) and, in response, prevent the user from making further reservations until the number of pending reservations is below the allowable number (e.g., by canceling a pending reservation or waiting for the reservation to expire).

The modules in travel services system 124 are configured to train a machine learning technique to classify a given user or subscriber using the travel services activities of the user or subscriber by establishing relationships between known travel services activities and known or manually assigned classifications to users or subscribers. The modules in travel services system 124 are configured to filter the available travel services provided to a given client device 110 based on the classification of the user of the client device 110, subscription types, and/or cancelation policies of the various travel services. The details of the travel services system 124 are provided below in connection with FIG. 2.

The system 100 further includes one or more third-party servers 130. The one or more third-party servers 130 may include one or more third-party application(s) 132. The one or more third-party application(s) 132, executing on third-party server(s) 130, may interact with the server system 108 via API server 120 via a programmatic interface provided by the API server 120. For example, one or more the third-party applications 132 may request and utilize information from the server system 108 via the API server 120 to support one or more features or functions on a website hosted by the third party or an application hosted by the third party. The third-party website or application 132, for example, may provide software version analysis functionality that is supported by relevant functionality and data in the server system 108.

Third-party servers 130 may include an existing non-subscription-based travel service. Such non-subscription-based travel services can be used to search for travel services at a first cost available to non-subscribers of the travel services system 124. The travel services system 124 may query the third-party servers 130 on a periodic basis to obtain the first costs for the travel services provided by the travel services system 124. The first costs may represent a per-night rate of the travel services multiplied by a predetermined number of nights (e.g., 6 nights).

Figure 2:
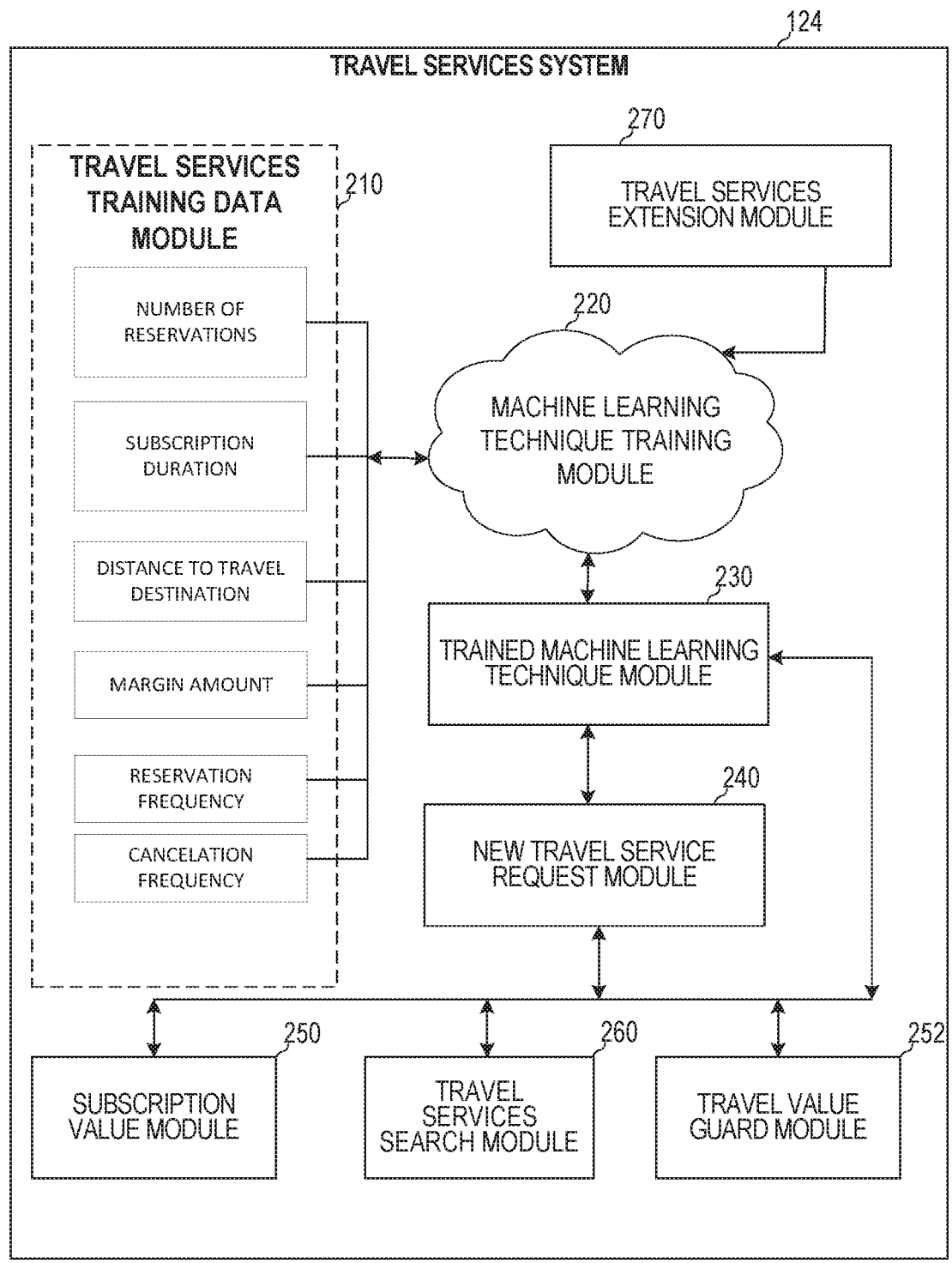
FIG. 2 illustrates a travel services system, according to some example embodiments.

FIG. 2 illustrates a travel services system 124, according to some example embodiments. The travel services system 124 includes a travel services training data module 210, a machine learning technique training module 220, a trained machine learning technique module 230, a new travel service request module 240, a subscription value module 250, travel services extension module 270, a travel services search module 260, and a travel value guard module 252. In some implementations, some modules of the travel services system 124 may be implemented on server system 108 and others may be implemented on third-party servers 130 or client device 110. In some implementations, all of the modules of the travel services system 124 are implemented on server system 108, on third-party servers 130, or on client device 110. In such cases, server system 108 communicates information to third-party servers 130 based on the modules implemented and vice versa.

The new travel service request module 240 may communicate with the client device 110 to receive travel information including parameters and criteria for a new travel service request from a user. For example, via the graphical user interface of the client device 110, the user can select a travel destination or geographical location and can, optionally, input the desired trip start date, end date, and/or trip length. The new travel service request module 240 may communicate this user selection to the travel services search module 260 to identify a list of available travel services. The new travel service request module 240 may communicate an identifier of the user of the client device 110 to the subscription value module 250. In some embodiments, the parameters are automatically determined and computed on a nightly basis and used to curate a list of travel services over the course of a given user. In such cases, the user may enter a travel destination and the curated list is presented with previously selected travel dates (e.g., travel dates not inputted or selected by the user) (e.g., with travel dates having predetermined durations). In such cases, the new travel service request module 240 may, on a periodic basis (e.g., nightly) retrieve subscription values for one or more users. The new travel service request module 240 may also retrieve one or more travel destinations. The new travel service request module 240 provides the subscription values and the travel destinations, as the selection to the travel services search module 260. In this way, the travel services search module 260 identifies available travel services across a range of dates for one or more users and curates such a list for subsequent presentation to the user. The user can simply enter a desired destination, and the available and curated list of travel services at the destination, together with the available travel dates, are presented to the user. This is performed without having to communicate with each individual provider of the travel services to obtain cost information and availability when a user requests to view available travel services.

The travel services search module 260 may communicate with the subscription value module 250 to obtain a subscription value for the user of the client device 110. The subscription value module 250 may communicate with the databases 128 to obtain the booking date and the computed subscription cost of the identified user along with a geographical location of the user. The booking date may be the current date indicating when the search module 260 conducts the search for available travel services and/or the date on which the user requests to view available travel services is received from the new travel service request module 240. The subscription value module 250 may compute the subscription value based on various parameters: an aggregated subscription cost parameter, an amortized subscription cost parameter. For example, if monthly subscription of a user is $1,000, the aggregated subscription cost may be estimated to be $1,000, which is the number of months between the booking date and the travel date multiplied by the monthly subscription cost. The amortized subscription cost parameter may be computed based on a cost of the monthly subscription divided by the daily subscription cost. For example, the amortized subscription cost may be $2,000 divided by 60 days multiplied by the number of days between the booking date and the travel date. Assuming the number of days is 30, the estimated amortized subscription cost may be computed to be $999.90. In an example, the subscription value module 250 computes a subscription value as an average of the aggregated and the amortized subscription cost parameters.

The subscription value module 250 computes an estimate of the total amount the user will pay for the subscription by aggregating the total amount that will pay (e.g., based on the user's monthly subscription cost) from the present time until 10 weeks from the present time. Namely, the subscription value module 250 assumes the user would have continued paying for the subscription until the travel start date from the booking date and estimates how much the user will end up paying for the subscription from the current booking date until the future travel start date. As an example, if the subscription costs $2500 per month, the subscription value module 250 may determine that the trip will start 10 weeks from the present day and, in the next 10 weeks, three months' worth of subscription fees (e.g., $7500) will be paid (assuming the fee is paid on the first day of every month).

Accordingly, the subscription value module 250 may compute $7500 as the aggregated subscription cost parameter of the subscription value that will be paid from present time (the booking date) until the trip start time.

The subscription value module 250 may also compute as the subscription value an amortized amount of the subscription cost over an annual basis. For example, the subscription value module 250 may determine $30,000 as the total cost of the subscription for the entire year (e.g., by multiplying the number of months in a year, 12, by the monthly subscription fee, $2500). The subscription value module 250 may amortize the yearly subscription cost on a specified repeated period (e.g., daily, monthly, hourly, weekly) basis to determine the amount of the subscription fee that will be paid from the booking date until the travel start date. For example, if the trip is planned to start in 10 weeks, the subscription value module 250 computes $5,769 as the amortized subscription cost parameter of the subscription value, which is a total of 10 weeks' worth of the weekly subscription cost (e.g., annual subscription fee $30,000 divided by 52 weeks per year and multiplied by 10 weeks).

The subscription value module 250 may compute the subscription value as a function of the aggregate subscription cost expected to be paid by the time the trip starts and the amortized subscription cost by the time the trip starts as measured from the booking date. For example, if the user plans the trip to start in 10 weeks from today (the booking date), the subscription value module 250 computes an average of $7,500 and $5,769. Then, the subscription value module 250 computes the subscription value by applying a first weight (e.g., multiplying) to the average. The value of the first weight may be based on the subscription type of the user making the reservation.

The subscription value module 250 provides the parameters of the subscription values to the travel value guard module 252. The travel value guard module 252 is configured to compute a guard range having a minimum travel value and a maximum purchase amount based on the subscription values. The guard range ensures that the travel services identified by the travel services search module 260 satisfy minimum parameters that ensure a subscriber receives a better deal or bargain than making the same reservation for the travel service through another travel service system (e.g., a travel service system provided by the third-party servers 130). The guard range also ensures that the travel services identified by the travel services search module 260 satisfy a margin amount that provides a positive or negative level of profitability to the travel services system 124. The margin amount may be computed based on a difference between the booking date and the travel date, such that the margin is greater when the difference is smaller than a threshold and is lower when the difference is greater than a threshold. Namely, the minimum travel value is used to ensure that travel service results provided to the user have a value, as determined by the first cost associated with the travel services, that is greater than the minimum travel value. Also, the maximum purchase amounts of each subscription value are used to ensure that the travel service results provided to the user are not valued, as determined by the second cost associated with the travel services, greater than the respective maximum purchase amount. In some cases, the first and second costs may be the same values and in other cases they are different values.

As an example, the travel value guard module 252 computes the minimum travel value as a function of the aggregated (or accumulated) subscription cost parameter of the subscription value. Specifically, the travel value guard module 252 computes the minimum travel value as 80 percent of the aggregated (or accumulated) subscription cost parameter. Accordingly, if the aggregated subscription cost is determined to be $7,500, the minimum travel value is computed to be $6,000 (e.g., 80 percent of $7,500).

As an example, the travel value guard module 252 computes the maximum purchase amounts for each of the first and second subscription values as a function of an adjusted average of the aggregated and amortized subscription cost parameters and the corresponding first and second weights. The average may be adjusted based on a margin amount or value that is associated with the user retrieved by the travel value guard module 252 from the databases 128. Specifically, the travel value guard module 252 computes a maximum purchase amount as an average of the aggregated (or accumulated) subscription cost parameter and the amortized subscription cost parameter offset by the retrieved margin.

The travel services search module 260 receives the guard range from the travel value guard module 252 and searches for travel services that fall within the guard range and that satisfy the travel criteria (optionally) supplied by the user received from the new travel service request module 240. As an example, the travel services search module 260 first searches for all of the travel services that are available on the travel date range (e.g., the travel start date and the travel duration) received from the client device 110 and/or received automatically by the travel service request module 240. The travel services search module 260 restricts or limits the search to those travel services that are within a specified range (e.g., 25 miles) of the travel destination or geographical region received from the client device 110 and/or received automatically by the travel service request module 240. In some cases, the travel services search module 260 accesses a predefined list of travel destinations and searches all of the available travel services available in 6-day periods (or other defined periods) during the course of the entire year. The travel services search module 260 searches various combinations of travel dates and destinations to generate millions of combinations of possible travel destinations at various periods.

After the travel services search module 260 identifies the list of travel services that are available on the travel start date and that meet the travel destination or geographical region parameters, the travel services search module 260 obtains first and second costs associated with each of the travel destinations from the databases 128. The travel services search module 260 compares the first or second costs of each of the identified travel services to the minimum travel value received from the travel value guard module 252. The travel services search module 260 removes or filters from the list any travel service that has a first or second cost that is below the minimum travel value. The travel services search module 260 may also filter out and remove any travel destination that has a cancelation policy that fails to satisfy cancelation policy criteria. The travel services search module 260 removes or filters from the list any travel service that has a second cost that is above the maximum purchase amount received from the travel value guard module 252. In some embodiments, to determine the first or second cost, the travel services search module 260 may multiply a nightly first and/or second cost of each travel service during the travel period by the number of days in the travel service request.

The travel services system 124 presents the identified list of travel services to a subscriber. The travel services extension module 270 determines whether or not to present an option to extend the predetermined durations of each one or a given subset of the list of travel services. The travel services extension module 270 computes the fee associated with the option to extend based on the first costs associated with the travel services.

For example, each travel service that is presented to the user is associated with a respective travel duration. For example, a given travel service may correspond to a 5-night hotel stay in which case the travel duration is 5 nights. In some cases, the travel services extension module 270 adds more flexibility for the subscriber to make travel reservations by presenting an option to extend the travel duration of a given travel service. This option may be provided for each travel service that is presented to the user or for a selected subset of the travel services. In some cases, the option to extend may be presented for travel services that are of a first type and may be excluded for travel services that are of a second type.

In some embodiments, the travel services extension module 270 computes the fee associated with the option to extend based on the first cost of the given travel service. For example, the travel services extension module 270 may retrieve the first cost of a given travel service representing the cost per day, week, month or other specified interval that a non-subscriber of the travel services system 124 pays to reserve or consume the given travel service. The travel services extension module 270 determines the difference or balance between a requested duration and the predetermined duration of a given travel service. The travel services extension module 270 computes the fee as a function of the retrieved first cost and determined difference or balance (e.g., by multiplying a per night first cost rate of the travel service by the balance or difference).

In some cases, the travel services extension module 270 accesses a website associated with the travel service to retrieve the first cost for the date(s) on which the subscriber plans to consume the travel service that extend beyond the predetermined duration. For example, if the user would like to extend by one additional day (before or after) the predetermined duration, the travel services extension module 270 identifies the date(s) that precede or follow the predetermined duration and accesses the website associated with the travel service to determine the first cost for that date(s) based on which the fee for extension is computed. Alternatively, the travel services extension module 270 retrieves the first cost of the travel service from a database of the travel services system 124 and similarly computes the fee based on the balance or difference between the requested duration and the predetermined duration using the first cost. In such cases, the first cost may be outdated depending on how long ago the first cost was accessed from a third-party database in association with the given travel service. In some cases, the travel services extension module 270 determines how far out in advance a given travel service is being reserved. The travel services extension module 270 may determine whether to retrieve the first cost from the third-party database or website of the travel service or from a local database that stores a previously accessed cost for the travel service based on how far in advance a reservation is being made.

For example, the travel services extension module 270 may communicate with the new travel service request module 240 to obtain a requested start date for a given travel service request received from a user. The travel services extension module 270 may compute a difference between the requested start date and the current date to determine how far in advance the reservation is being made. The travel services extension module 270 may compare the difference to a threshold (e.g., 3 months). In response to determining that the difference exceeds the threshold, the travel services extension module 270 may retrieve the first cost of the travel service (for associating a fee with the option to extend) from the website associated with the travel service (e.g., a hotel website directly or another website that is available to non-subscribers of the travel services system 124 for reserving travel services). In response to determining that the difference fails to exceed the threshold, the travel services extension module 270 may retrieve the first cost from a local storage (e.g., previously cached or retrieved copy of the first cost).

After the travel services extension module 270 retrieves the first cost for the travel service, the travel services extension module 270 determines whether a margin is to be applied to the first cost to compute the fee for the option to extend. In some cases, the margin is positive or negative. In some cases, the margin is based on a classification of the user, how far in advance a reservation is being made for the travel service, a subscription value of the user, a type of travel service being requested (e.g., cruise versus hotel stay), and/or other suitable criteria. The travel services extension module 270 applies the margin to the first cost to increase or decrease the first cost of the travel service (e.g., the off-the-shelf cost for purchasing or booking the travel service for the period of time beyond the predetermined duration of the travel service). The travel services extension module 270 then presents an option to the user to select to extend the predetermined duration of the travel service. The option may indicate the computed fee for extending the duration (with or without the margin applied to it). In response to the user selecting the option to extend, the travel services extension module 270 may book the travel service for the user for the entire duration requested by the user. To book the reservation with the extended duration, the travel services extension module 270 may apply a second cost to consume the reservation for the predetermined duration and may apply the first cost to consume the reservation for the extended period of time beyond the predetermined duration. As an example, when the requested travel duration is 7 nights, the travel services extension module 270 may pay the hotel or retrieve a previously purchased stay at a hotel for 5 nights at the second cost (e.g., the pre-negotiated cost) and may then pay the hotel (e.g., using the website of the hotel) for the balance of 2 nights at the first cost. In this way, the user need only to continue paying the monthly subscription cost to the travel services system 124 to remain a subscriber to consume the requested travel service and only has to pay the fee for the option for the balance (e.g., 2 nights) of the requested duration of the travel service.

In some embodiments, in response to receiving a user selection of the option to extend, the travel services extension module 270 may direct the user to a source of the first cost (e.g., a website of the hotel or travel service) to allow the user to directly book the balance of the duration with the hotel or travel service. In such cases, the first cost is paid by the user directly to the website of the hotel or travel service rather than to the travel services system 124.

In some embodiments, the travel services extension module 270 conditions presentation of the option to extend based on whether the first cost for extending the predetermined duration exceeds a threshold. In some embodiments, the travel services extension module 270 conditions presentation of the option to extend based on whether the balance, between the requested duration for the travel service and the predetermined duration of the travel service available to be reserved by the travel services system 124, exceeds a threshold. In some cases, the thresholds differ based on subscription status, user classification, travel service types, and/or other suitable criteria.

In some cases, the travel services search module 260 communicates with the trained machine learning technique module 230 to obtain a classification for the user making the travel request and further filters or removes travel services based on the classification of the user. The travel services search module 260 provides the filtered list of travel services back to the new travel service request module 240 for provision to the client device 110 and presentation to the user for selection and requesting to make a reservation.

To classify users, the trained machine learning technique module 230 is initially trained based on training data. Specifically, the travel services training data module 210 includes a list of travel services activities associated with various subscribers of the travel services system 124. The travel services activities are obtained by the travel services training data module 210 from database 128 and/or from third-party server 130. For example, the travel services training data module 210 obtains the number of reservations made by a user from database 128 and obtains the cancelation frequency from third-party server 130. The travel services training data module 210 may access training data including the number of reservations made by each user, the subscription duration of each user, the distance to travel destination of each user, the margin amount of each user, the reservation frequency of each user, the cancelation frequency of each user, and an assigned classification of each user. The classification may represent a level of activity of each user from not active, to medium active, to very active. The classification is used to control and filter the types and quantity of travel services provided to different users and vary the thresholds used to control whether or not to present an option to extend a predetermined duration of a given travel service. This can be used as a measure to ensure that users who are not very active are provided a greater quantity of a better type of travel services than a very active user to incentivize the non-active user to utilize the travel services system 124.

In some embodiments, machine learning technique training module 220 is trained to predict a classification for a subscriber of the travel services system 124 by establishing a relationship between one or more known travel services activities of other users provided by travel services training data module 210 and the corresponding known classification of the other users provided by the travel services training data module 210. In some embodiments, machine learning technique training module 220 is trained to predict a likelihood of consumption of a given travel service for a subscriber of the travel services system 124 by establishing a relationship between one or more known travel services activities of other users (e.g., destinations the other users booked) and the locations of the other users provided by travel services training data module 210.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data (e.g., travel services activity information) in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying a given user based on travel activities of the user.

The machine-learning algorithms utilize features (e.g., various combinations of travel services activities performed by other users in interacting and making reservations with the travel services system 124) for analyzing the data to generate assessments (e.g., a classification of the users). A feature is an individual measurable property of a phenomenon being observed. The concept of a feature is related to that of an explanatory variable used in statistical techniques such as linear regression. Choosing informative, discriminating, and independent features is important for effective operation of pattern recognition, classification, and regression. Features may be of different types, such as numeric features, strings, and graphs.

In one example embodiment, the features may be of different types and may include one or more of a number of reservations made by each user, the subscription duration of each user, the distance to travel destination of each user, the margin amount of each user, geographical locations of the users and the destinations, the reservation frequency of each user, and the cancelation frequency of each user.

The machine-learning algorithms utilize the training data to find correlations among the identified features that affect the outcome or assessment (e.g., the known or assigned classification of each user). In some example embodiments, the training data includes labeled data, which is known data for one or more identified features and one or more outcomes, such as the assigned classification of the user.

Once the training data are collected and processed, machine learning technique training module 220 can be built using either statistical learning or machine learning techniques. In one embodiment, regression analysis can be used to build the machine learning technique training module 220. Regression analysis is a statistical process for estimating the relationships among variables. There are a number of known methods to perform regression analysis. Linear regression or ordinary least squares regression, among others, are "parametric" in that the regression function defined in terms of a finite number of unknown model parameters that can be estimated from training data. For days to pending prediction, a regression model (e.g., Equation 1) can be defined, for example, as:

$$H=f(X,\beta),\qquad\text{(Equation 1)}$$

where "H" denotes the known days to pending amount for a set of properties, "X" denotes a vector of input variables (e.g., any one of the travel services activities associated with the set of users), and "β" denotes a vector of unknown parameters to be determined or trained for the regression model.

The training data that include travel services activities of various users and the corresponding classification (which can be manually or automatically specified for each user) provide a set of known H values (e.g., the classification of a user) having corresponding X values (e.g., feature vectors extracted from the travel services activities). Using these data, the model parameter β can be computed using data fitting techniques such as least squares, maximum likelihood, or the like. Once β is estimated, the model can then compute H (e.g., a user travel services classification) for a new set of X values (e.g., feature vectors extracted from a new set of travel services activities). As another example, the training data that include travel services activities of various users and the corresponding classification (which can be manually or automatically specified for each user) provide a set of known H values having corresponding X values (e.g., feature vectors extracted from the travel services activities). Using these data, the model parameter β can be computed using data fitting techniques such as least squares, maximum likelihood, or the like. Once β is estimated, the model can then compute H (e.g., a user travel services classification) for a new set of X values (e.g., feature vectors extracted from a new set of travel services activities).

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised, indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data on which it is has not been trained. In a second example, a false positive rate or false negative rate may be used to evaluate the models after finalization. In a third example, a delineation between data clusterings is used to select a model that produces the clearest bounds for its clusters of data. In some embodiments, the machine learning technique training module 220 is trained to establish a relationship to classify a user based on a logistic regression of one or more features (e.g., training data received from travel services training data module 210).

After being trained, the machine learning technique is provided to trained machine learning technique module 230. In one example, the coefficient values of the machine learning technique (e.g., the linear model) are stored in a storage of trained machine learning technique module 230. Trained machine learning technique module 230 is configured to receive new travel services activities of a new user from new travel service request module 240. For example, the new travel service request module 240 receives a user input that identifies a desired travel destination and travel dates and accesses previously stored interaction information for the user (e.g., the number of prior reservations made by the user and the distance traveled by the user from the user's home address to the travel destinations). The new travel service request module 240 accesses database 128 and/or server 130 to obtain the travel services activities for the new user. For example, new travel service request module 240 obtains the number of reservations previously made by the user, the subscription duration of the user, the distance traveled by the user to the destinations, the margin amount stored for the user, the reservation frequency of the user, and/or the cancelation frequency of the user. The new travel service request module 240 instructs the trained machine learning technique module 230 to apply the trained machine learning technique using the previously computed coefficients to the data provided by the new travel service request module 240. Trained machine learning technique module 230 provides a classification for the new user based on the data provided by the new travel service request module 240. In another example, trained machine learning technique module 230 provides a likelihood of consumption for each travel service for the new user based on the data provided by the new travel service request module 240.

Figure 3:
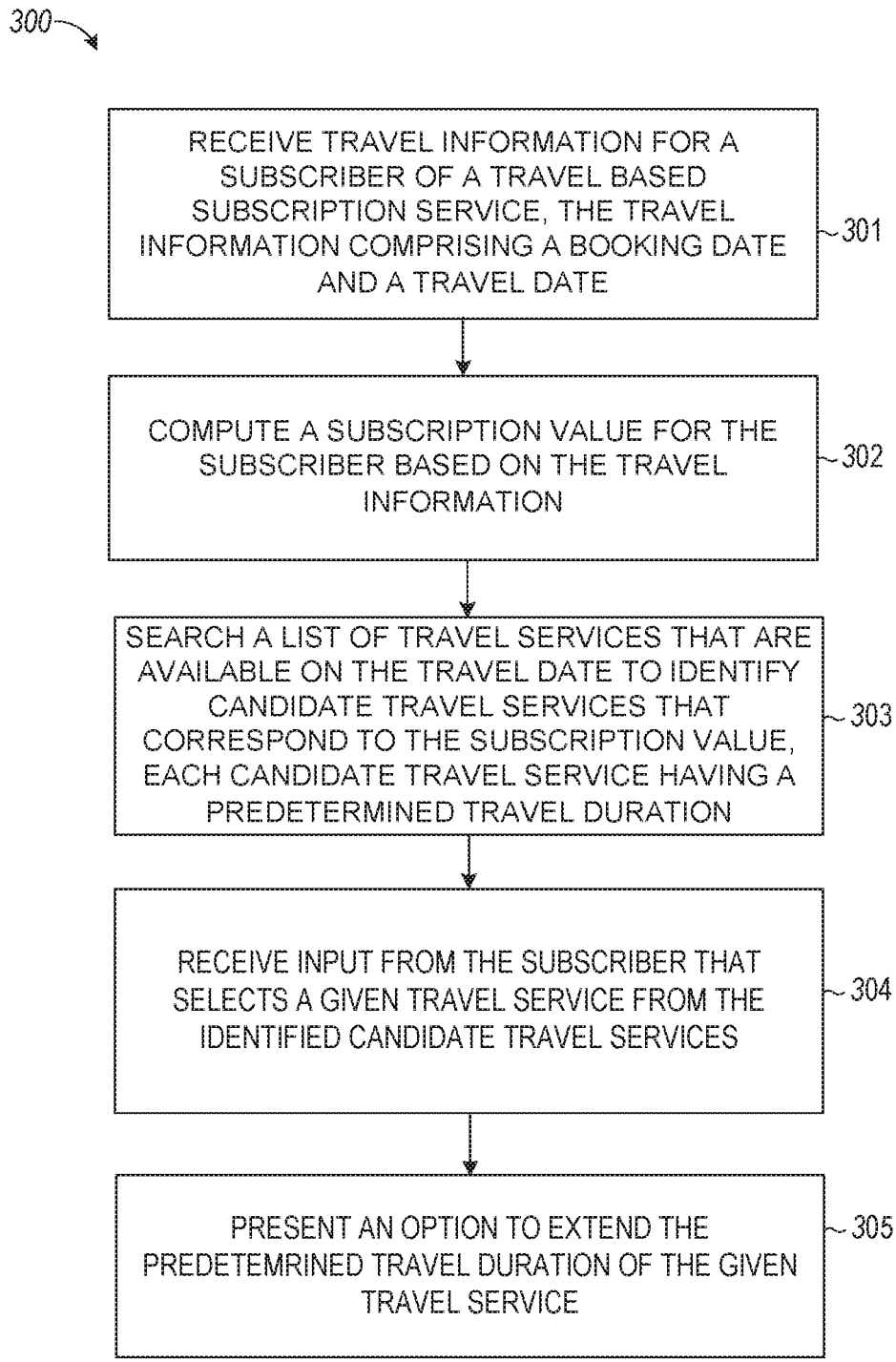
FIGS. 3-4 illustrate flow diagrams of processes of the travel services system, according to some example embodiments.
Figure 4:
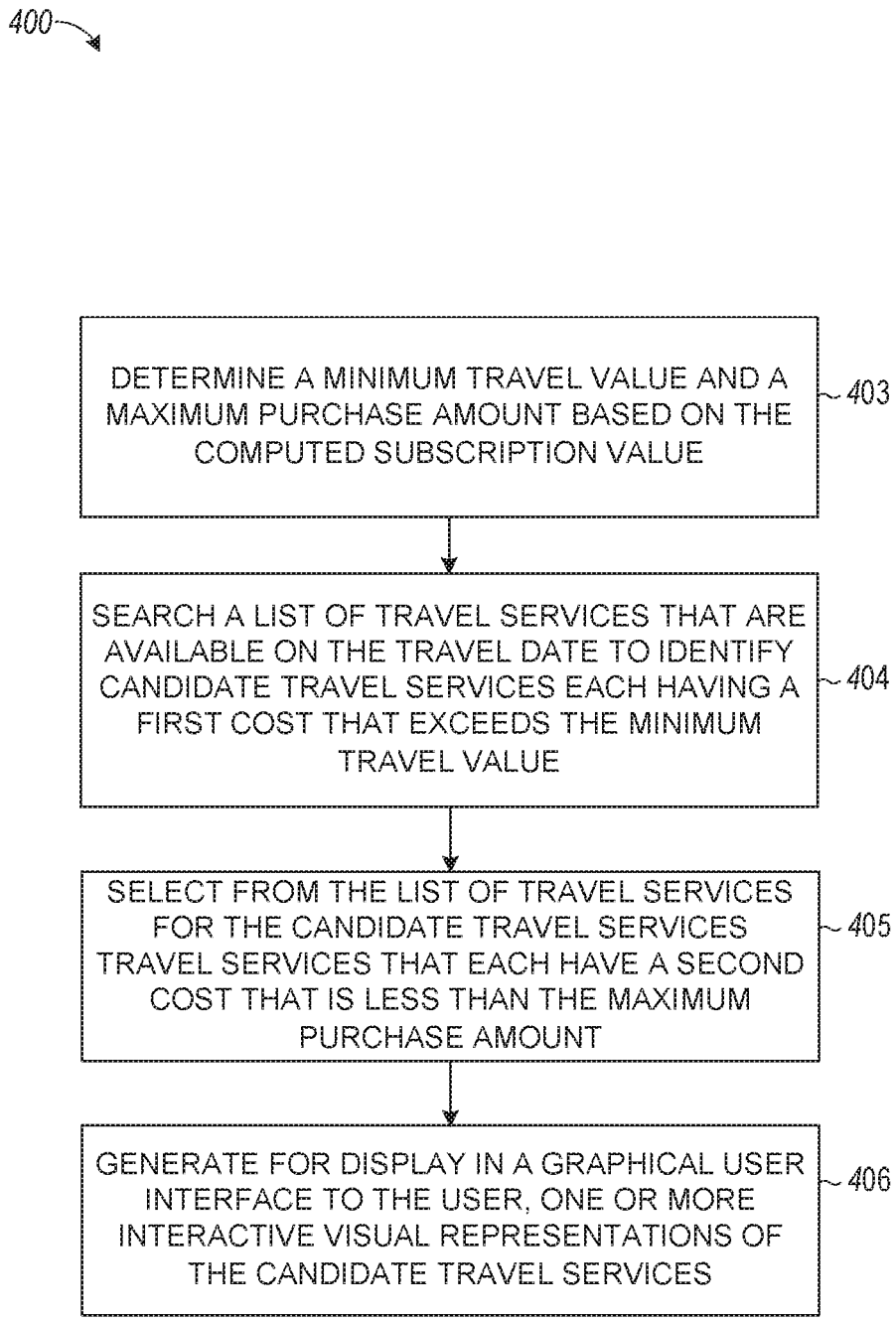

FIGS. 3-4 illustrate flow diagrams of processes of the travel services system 124, according to some example embodiments. The processes 300, 400 may be embodied in computer-readable instructions for execution by one or more processors such that the operations of the processes 300, 400 may be performed in part or in whole by the functional components of the server system 108; accordingly, the processes 300, 400 are described below by way of example with reference thereto. However, in other embodiments at least some of the operations of the processes 300, 400 may be deployed on various other hardware configurations. The processes 300, 400 are therefore not intended to be limited to the server system 108 and can be implemented in whole, or in part, by any other component. Any operation in the processes 300, 400 can be performed in any order or entirely omitted and skipped.

At operation 301, a computing system (e.g., server system 108) receives travel information for a subscriber of a travel-based subscription service. The travel information comprises a booking date and a travel date.

At operation 302, the computing system computes a subscription value for the subscriber based on the travel information.

At operation 303, the computing system searches a list of travel services that are available on the travel date to identify candidate travel services that correspond to the subscription value, each candidate travel service having a predetermined travel duration.

At operation 304, the computing system receives input from the subscriber that selects a given travel service from the identified candidate travel services.

At operation 305, the computing system presents an option to extend the predetermined travel duration of the given travel service.

At operation 403, the computing system determines a minimum travel value and a maximum purchase amount based on the computed subscription value.

At operation 404, the computing system searches a list of travel services that are available on the travel date to identify candidate travel services each having a first cost that exceeds the minimum travel value.

At operation 405, the computing system selects from the list of travel services for the candidate travel services, travel services that each have a second cost that is less than the maximum purchase amount.

At operation 406, the computing system generates for display in a graphical user interface to the user, one or more interactive visual representations of the candidate travel services.

FIG. 5 is an illustrative graphical user interface of the travel services system 124, according to some example embodiments. As shown in FIG. 5, a user Julie may access the travel services system 124. As shown in FIG. 5, after the user Julie activates the subscription, the user (Julie) can input travel search criteria 501. This travel search criteria 501 may include various parameters 502 including a travel destination, distance to the destination, start date of the travel, end date of the travel, number of days in the trip, quality of the travel services, and/or any combination thereof. The travel services system 124 processes the travel search criteria and automatically generates a list of matching travel services for presentation using one or more interactive visual representations 503. In some cases, the travel services system 124 processes the travel search criteria and automatically selects one of a plurality of previously generated and curated lists of travel services for presentation using one or more interactive visual representations 503. A user can select any one of the interactive visual representations 503 to instruct the travel services system 124 to complete a reservation for the corresponding travel service (e.g., book a hotel room) associated with the selected visual representation.

In some embodiments, the travel services in the graphical user interface of FIG. 5 are generated using individualized travel service lists for the user based on travel behaviors, geographical location, demographics, or a margin target for the user. For example, the travel services system 124 may further filter or reorganize the list of available travel services presented to the first user in FIG. 5 based on a profile of the first user that indicates various attributes of the user (e.g., travel behaviors, geographical location, demographics, a subscription type, cancelation frequency, number of reservations made in a given time interval, or a margin target specific to the user or classification of the user).

As an example, after receiving the search criteria from the first user (Julie), the travel services system 124 may obtain a list of travel services that are available and that match the search criteria. The travel services system 124 generates a subscription value for the first user (Julie). The travel services system 124 compares a cost of each travel service with the subscription value. Based on this comparison, the travel services system 124 generates a filtered or curated list of travel services and presents the list to the user in FIG. 5.

In some embodiments, the travel services system 124 may determine that the user Julie selected a given travel service when the user taps or selects the visual representation 503. In response, the travel services system 124 presents a message 510 that identifies the travel service selected by the user. In some cases, the travel services system 124 may determine that the requested duration of travel input in travel search criteria 501 is greater than the predetermined duration of the selected travel service. For example, the user Julie may be interested in staying at a hotel for 7 nights but the selected travel service has a predetermined duration of 5 nights (or days). In response, the travel services system 124 may inform the user in message 510 that the user's subscription only allows the user to reserve the requested travel service for 5 nights and may provide an option 514 for the user to extend the predetermined duration for the additional two nights. The message 510 may indicate the fee (computed based on the first cost) (e.g., $245 per night or day) associated with extending the predetermined duration. This fee may be computed by the travel services extension module 270 based on a margin, previously stored first costs of the travel service, and/or by accessing a website or source of the travel service. In response to receiving a user selection of option 514, the travel services system 124 may book the travel service for the user Julie based on a combination of booking the travel service with the predetermined duration at the second cost and the additional amount of time (the balance between the requested duration and the predetermined duration) at the first cost of the travel service.

In some cases, the travel services system 124 may condition presentation of the option 514 on a variety of factors. For example, the option 514 may be conditioned for display based on whether the first cost for extending the predetermined duration exceeds a threshold. In some embodiments, option 514 may be conditioned for display based on whether the balance, between the requested duration for the travel service and the predetermined duration of the travel service available to be reserved by the travel services system 124, exceeds a threshold. In some cases, the thresholds differ based on subscription status, user classification, travel service types, and/or other suitable criteria.

In some embodiments, the travel services system 124 may present an option to extend the predetermined duration of a given travel service for each and every or a subset of travel services that are available. In such cases, the travel services system 124 provides the option to extend the predetermine duration regardless or independent from any start or end date provided by a user in the travel search criteria 501. Namely, it is possible that the user does not input any start or end date for travel and may only be interested in the available travel services in a given region. In such cases, the travel services system 124 identifies the available travel services and presents the travel services to the user. Each travel service may be associated with a predetermined duration having start and end dates. The user may be interested in reserving one of the listed travel services but may desire additional time. In such cases, the travel services system 124 presents the option to extend with an indication of the fee to extend (computed based on the respective first cost of the travel service) in association with the travel service. The user can select the option to extend for any preset or user requested amount of time. Depending on how much longer than the predetermined duration the user requests to extend, the fee associated with the option increases or decreases. Namely, if the user extends for 3 days, the fee to extend may be a first amount, and if the user extends for 5 days, the fee to extend may be a second amount greater than the first amount. In response to the user selecting the option to extend and specifying the amount by which to extend, the travel services system 124 books the associated travel service using a combination of the travel service at the second cost (based on the pre-negotiated rates) and purchasing the additional requested amount of time from a third-party source at the first cost (e.g., by communicating with the source or website of the travel service and booking the travel service for the balance of days, such as the additional requested amount of time).

Figure 6:
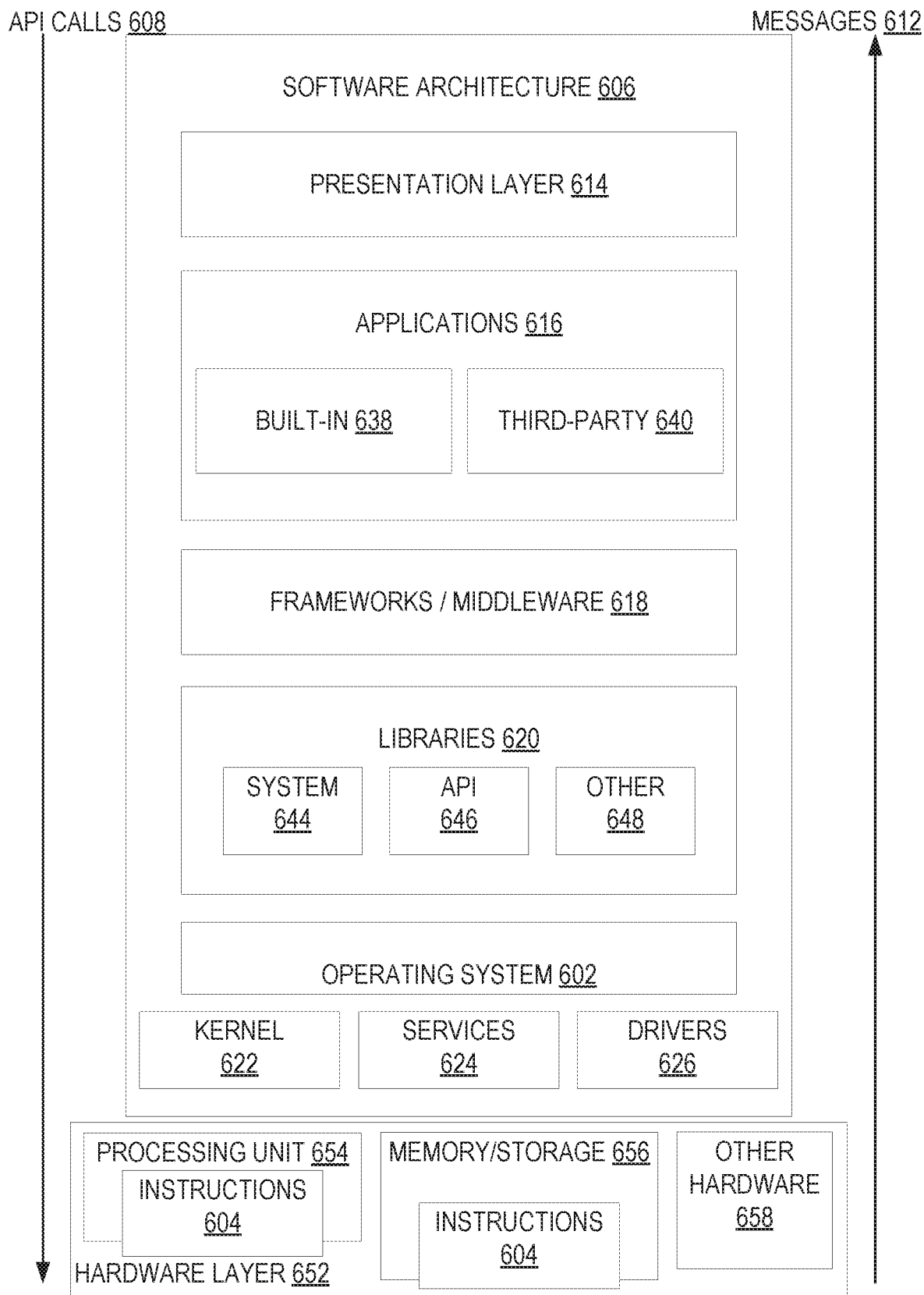
FIG. 6 is a block diagram illustrating an example of a software architecture that may be installed on a machine, according to some example embodiments.

FIG. 6 is a block diagram illustrating software architecture 606, which can be installed on any one or more of the devices described above. For example, in various embodiments, client devices 110 and servers and systems 130, 108, 120, 122, and 124 may be implemented using some or all of the elements of software architecture 606. FIG. 6 is merely a non-limiting example of a software architecture, and it will be appreciated that many other architectures can be implemented to facilitate the functionality described herein. In various embodiments, the software architecture 606 is implemented by hardware (including a hardware layer 652 with processing unit 654, memory/storage 656, and other hardware 658) such as machine 700 of FIG. 7 that includes processors 704, memory/storage 706, and input/output (I/O) components 718. As explained below, the processing unit 654 is configured to execute instructions 604 that are stored in memory/storage 656. In this example, the software architecture 606 can be conceptualized as a stack of layers where each layer may provide a particular functionality. For example, the software architecture 606 includes layers such as an operating system 602, libraries 620, frameworks 618, and applications 616. Operationally, the applications 616 invoke API calls 608 through the software stack and receive messages 612 in response to the API calls 608, consistent with some embodiments.

In various implementations, the operating system 602 manages hardware resources and provides common services. The operating system 602 includes, for example, a kernel 622, services 624, and drivers 626. The kernel 622 acts as an abstraction layer between the hardware and the other software layers, consistent with some embodiments. For example, the kernel 622 provides memory management, processor management (e.g., scheduling), component management, networking, and security settings, among other functionality. The services 624 can provide other common services for the other software layers. The drivers 626 are responsible for controlling or interfacing with the underlying hardware, according to some embodiments. For instance, the drivers 626 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 620 provide a low-level common infrastructure utilized by the applications 616. The libraries 620 can include system libraries 644 (e.g., C standard library) that can provide functions such as memory allocation functions, string manipulation functions, mathematic functions, and the like. In addition, the libraries 620 can include API libraries 646 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 620 can also include a wide variety of other libraries 648 to provide many other APIs to the applications 616.

The frameworks 618 provide a high-level common infrastructure that can be utilized by the applications 616, according to some embodiments. For example, the frameworks 618 provide various graphic user interface functions, high-level resource management, high-level location services, and so forth. The frameworks 618 can provide a broad spectrum of other APIs that can be utilized by the applications 616, some of which may be specific to a particular operating system 602 or platform.

In an example embodiment, the applications 616 include built-in applications 638 including any one or more of a home application, a contacts application, a browser application, a book reader application, a location application, a media application, a messaging application, a game application, and a broad assortment of other applications such as a third-party application 640. According to some embodiments, the applications 616 are programs that execute functions defined in the programs. Various programming languages can be employed to create one or more of the applications 616, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™ ANDROID™ WINDOWS® Phone, or another mobile operating system. In this example, the third-party application 640 can invoke the API calls 608 provided by the operating system 602 to facilitate functionality described herein.

Some embodiments may particularly include a subscription-based travel services application. In certain embodiments, this may be a stand-alone application that operates to manage communications with a server system such as third-party servers 130 or server system 108. In other embodiments, this functionality may be integrated with another application. The subscription-based travel services application may request and display various data related to subscription-based travel services and may provide the capability for a user to input data related to the objects via a touch interface, keyboard, or using a camera device of machine 700, communication with a server system, and receipt and storage of object data in a memory/storage device. Presentation of information and user inputs associated with the information may be managed by subscription-based travel services application using different frameworks 618, library 620 elements, or operating system 602 elements operating on a machine 700.

Figure 7:
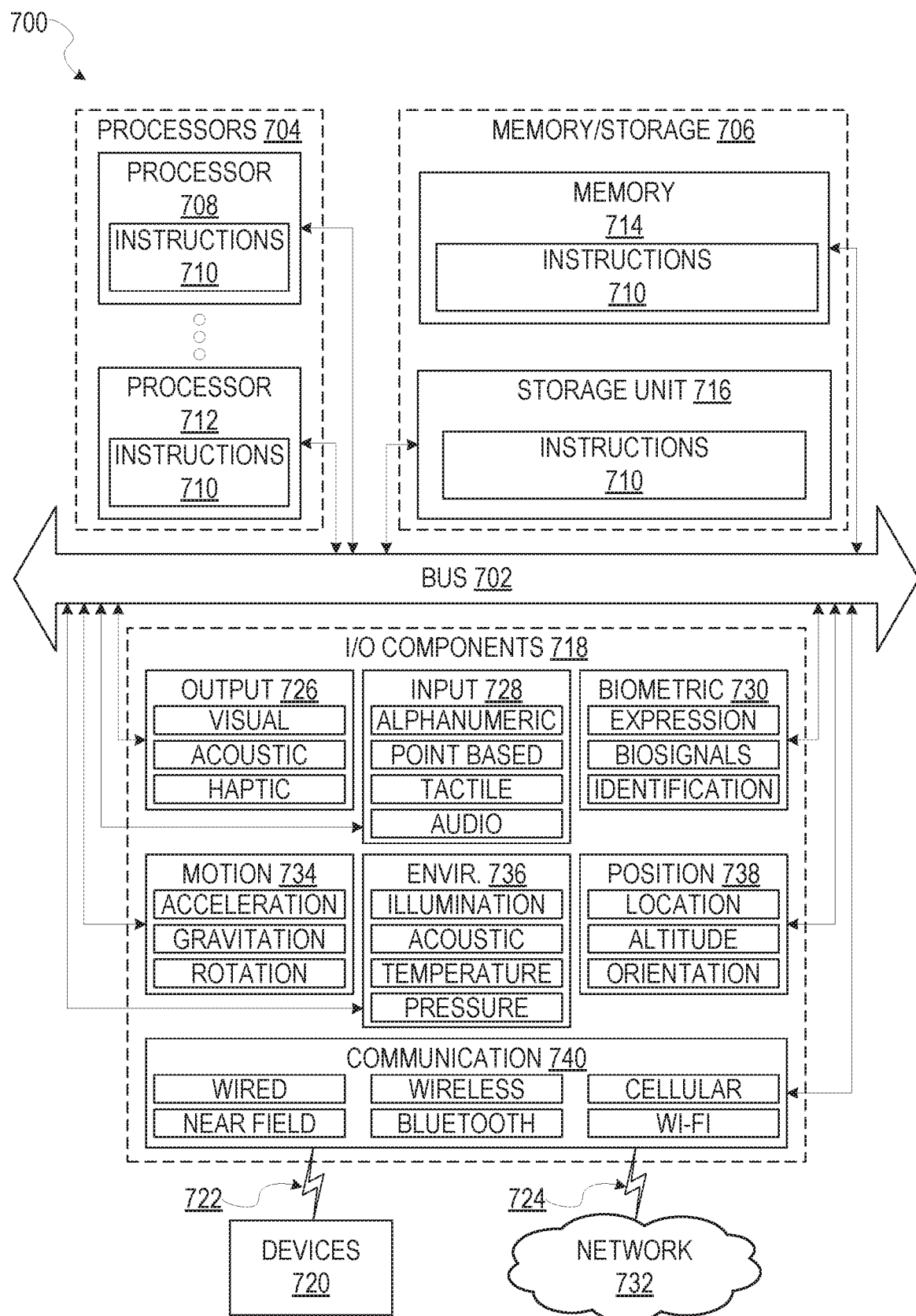
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application 616, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine 130, 108, 120, 122, 124, and the like, as a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines 700 that individually or jointly execute the instructions 710 to perform any one or more of the methodologies discussed herein.

In various embodiments, the machine 700 comprises processors 704, memory 714, and I/O components 718, which can be configured to communicate with each other via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 708 and a processor 712 that may execute the instructions 710. The term "processor" is intended to include multi-core processors 704 that may comprise two or more independent processors 704 (also referred to as "cores") that can execute instructions 710 contemporaneously. Although FIG. 7 shows multiple processors 704, the machine 700 may include a single processor 704 with a single core, a single processor 704 with multiple cores (e.g., a multi-core processor 704), multiple processors 704 with a single core, multiple processors 704 with multiples cores, or any combination thereof.

The memory/storage 706 comprises a main memory 714, a static memory, and a storage unit 716 accessible to the processors 704 via the bus 702, according to some embodiments. The storage unit 716 can include a machine-readable medium on which are stored the instructions 710 embodying any one or more of the methodologies or functions described herein. The instructions 710 can also reside, completely or at least partially, within the main memory 714, within the static memory, within at least one of the processors 704 (e.g., within the processor's cache memory), or any suitable combination thereof, during execution thereof by the machine 700. Accordingly, in various embodiments, the main memory 714, the static memory, and the processors 704 are considered machine-readable media.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium is shown, in an example embodiment, to be a single medium, the term "machine-readable medium" should be taken to include a single medium or multiple media (e.g., a centralized or distributed database, or associated caches and servers) able to store the instructions 710. The term "machine-readable medium" shall also be taken to include any medium, or combination of multiple media, that is capable of storing instructions (e.g., instructions 710) for execution by a machine (e.g., machine 700), such that the instructions 710, when executed by one or more processors of the machine 700 (e.g., processors 704), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 718 include a wide variety of components to receive input, provide output, produce output, transmit information, exchange information, capture measurements, and so on. In general, it will be appreciated that the IO components 718 can include many other components that are not shown in FIG. 7. The I/O components 718 are grouped according to functionality merely for simplifying the following discussion, and the grouping is in no way limiting. In various example embodiments, the I/O components 718 include output components 726 and input components 728. The output components 726 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 728 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the IO components 718 include biometric components 730, motion components 734, environmental components 736, or position components 738, among a wide array of other components. For example, the biometric components 730 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 718 may include communication components 740 operable to couple the machine 700 to a network 732 or devices 720 via a coupling 724 and a coupling 722, respectively. For example, the communication components 740 include a network interface component or another suitable device to interface with the network 732. In further examples, communication components 740 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 720 may be another machine 700 or any of a wide variety of peripheral devices (e.g., a peripheral device coupled via a USB).

Moreover, in some embodiments, the communication components 740 detect identifiers or include components operable to detect identifiers. For example, the communication components 740 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 740, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 732 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FI® network, another type of network, or a combination of two or more such networks. For example, the network 732 or a portion of the network 732 may include a wireless or cellular network, and the coupling 724 may be a Code Division Multiple Access (CDMA) connection, a Global System for Mobile communications (GSM) connection, or another type of cellular or wireless coupling. In this example, the coupling 722 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 710 are transmitted or received over the network 732 using a transmission medium via a network interface device (e.g., a network interface component included in the communication components 740) and utilizing any one of a number of well-known transfer protocols (e.g., Hypertext Transfer Protocol (HTTP)). Similarly, in other example embodiments, the instructions 710 are transmitted or received using a transmission medium via the coupling 722 (e.g., a peer-to-peer coupling) to the devices 720. The term "transmission medium" shall be taken to include any intangible medium that is capable of storing, encoding, or carrying the instructions 710 for execution by the machine 700, and includes digital or analog communications signals or other intangible media to facilitate communication of such software.

Furthermore, the machine-readable medium is non-transitory (in other words, not having any transitory signals) in that it does not embody a propagating signal. However, labeling the machine-readable medium "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   receiving, by one or more processors, travel information for a subscriber of a travel-based subscription service, the travel information comprising a booking date and a travel date;
   computing, by the one or more processors, a subscription value for the subscriber based on the travel information, the subscription value determining which travel services from a plurality of travel services are available for reservation by the subscriber under the travel-based subscription service, and the subscription value being proportional to, and being a function of, a duration between the booking date and the travel date, such that the subscription value is a first amount for a first duration between the booking date and the travel date and is a second amount, smaller than the first amount, for a second duration between a second booking date and a second travel date that is shorter than the first duration;

searching, by the one or more processors, a list of the travel services available for reservation that are also available on the travel date to identify candidate travel services each having a cost that corresponds to the computed subscription value, each of the identified candidate travel services having a predetermined travel duration;

training a machine learning technique to process training data comprising data associated with one or more users, the training being performed by:
retrieving a portion of the training data from a storage device;
extracting features from the training data for the one or more users;
utilizing the machine learning technique to estimate an attribute for the one or more users based on the extracted features; and
updating parameters of the machine learning technique based on the estimated attribute for the one or more users;

identifying, based on an output of the machine learning technique comprising the estimated attribute, a subset of the identified candidate travel services;

receiving, by the one or more processors, input from the subscriber that selects a given travel service from the subset of identified candidate travel services; and in response to receiving the input from the subscriber, presenting an option to extend the predetermined travel duration of the given travel service.

2. The computer-implemented method of claim 1, further comprising:
adding time to the predetermined travel duration of the given travel service in response to receiving a selection of the option; and
charging an account of the subscriber a fee in response to receiving the selection of the option.

3. The computer-implemented method of claim 2, further comprising: computing the fee for extending the predetermined travel duration based on an amount of time by which the predetermined travel duration is extended and a cost of the given travel service the cost of the given travel service corresponding to a price non-subscribers of the travel-based subscription service would pay for purchasing the given travel service.

4. The computer-implemented method of claim 3, wherein the amount of time comprises one or more days, and wherein the fee includes a markup relative to the cost of the given travel service; the cost of the given travel service corresponding to the price non-subscribers of the travel-based subscription service would pay for purchasing the given travel service.

5. The computer-implemented method of claim 1, further comprising:
determining a minimum travel value and a maximum purchase amount based on the computed subscription value, wherein each of the identified candidate travel services has a first cost that exceeds the minimum travel value and has a second cost that is less than the maximum purchase amount.

6. The computer-implemented method of claim 5, wherein:
the booking date is a current date; and
the subscription value comprises an accumulated value portion and an amortized value portion.

7. The computer-implemented method of claim 6, further comprising computing the accumulated value portion of the subscription value by:
determining a time interval between the booking date and the travel date; and
accumulating the subscription value over the determined time interval.

8. The computer-implemented method of claim 6, further comprising computing the amortized value portion of the subscription value by:
determining an annual cost of a subscription of the subscriber;
dividing the annual cost by a specified repeated time interval in a year;
determining a number of times the time interval repeats between the booking date and the travel date; and
computing the amortized value as a function of the divided annual cost and the determined number of times.

9. The computer-implemented method of claim 6, wherein the minimum travel value is determined based on a percentage of the accumulated value portion, and wherein the maximum purchase amount is determined as a function of the amortized value portion and the accumulated value portion.

10. The computer-implemented method of claim 5, further comprising aggregating the list of travel services by accessing one or more third-party databases that include the respective first costs of the candidate travel services, wherein the candidate travel services are available to non-subscribers of the subscription service for purchase at the respective first costs.

11. The computer-implemented method of claim 10, further comprising accessing one or more databases of the subscription service to obtain the second cost for each of the candidate travel services.

12. The computer-implemented method of claim 1, further comprising: determining a per day cost for reserving the given travel service based on a cost of the given travel service; the cost of the given travel service corresponding to a price non-subscribers of the travel-based subscription service would pay for purchasing the given travel service; and presenting a message that specifies the predetermined travel duration of the given travel service and the per day cost for extending the given travel service beyond the predetermined travel duration.

13. The computer-implemented method of claim 1, further comprising:
computing a travel duration based on the travel information received for the subscriber;
comparing the travel duration to the predetermined travel duration of the given travel service; and
presenting the option to extend in response to determining that the travel duration exceeds the travel duration of the given travel service.

14. The computer-implemented method of claim 13, further comprising excluding the option from being presented in response to determining that the travel duration does not exceed the travel duration of the given travel service.

15. The computer-implemented method of claim 1, further comprising:
computing a cost for extending the predetermined travel duration of the given travel service;
comparing the cost to a threshold; and
presenting the option to extend in response to determining that the cost for extending the predetermined travel duration is less than the threshold.

16. The computer-implemented method of claim 1, further comprising:
reserving the given travel service for the subscriber; and preventing the subscriber from reserving additional travel services until the reserved given travel service is consumed or canceled by the subscriber, wherein the subscriber is allowed to reserve only a threshold number of concurrent travel services reservations at any given time.

17. The computer-implemented method of claim 1, further comprising preventing the subscriber from searching for additional travel services until the given travel service is consumed or canceled by the subscriber, wherein the subscriber is prevented from searching for more than a threshold number of concurrent travel services reservations at any given time.

18. A system comprising:
a memory that stores instructions; and
one or more processors on a server configured by the instructions to perform operations comprising:
receiving travel information for a subscriber of a travel-based subscription service, the travel information comprising a booking date and a travel date;
computing a subscription value for the subscriber based on the travel information, the subscription value determining which travel services from a plurality of travel services are available for reservation by the subscriber under the travel-based subscription service, and the subscription value being proportional to, and being a function of, a duration between the booking date and the travel date, such that the subscription value is a first amount for a first duration between the booking date and the travel date and is a second amount, smaller than the first amount, for a second duration between a second booking date and a second travel date that is shorter than the first duration;
searching a list of the travel services available for reservation that are also available on the travel date to identify candidate travel services each having a cost that corresponds to the compute subscription value, each of the identified candidate travel services having a predetermined travel duration;
training a machine learning technique to process training data comprising data associated with one or more users, the training being performed by:
retrieving a portion of the training data from a storage device;
extracting features from the training data for the one or more users;
utilizing the machine learning technique to estimate an attribute for the one or more users based on the extracted features; and
updating parameters of the machine learning technique based on the estimated attribute for the one or more users;
identifying, based on an output of the machine learning technique comprising the estimated attribute, a subset of the identified candidate travel services;
receiving input from the subscriber that selects a given travel service from the subset of identified candidate travel services; and
in response to receiving the input from the subscriber, presenting an option to extend the predetermined travel duration of the given travel service.

19. A non-transitory computer-readable medium comprising instructions stored thereon that are executable by at least one processor to cause a computing device to perform operations comprising:
receiving travel information for a subscriber of a travel-based subscription service, the travel information comprising a booking date and a travel date;
computing a subscription value for the subscriber based on the travel information, the subscription value determining which travel services from a plurality of travel services are available for reservation by the subscriber under the travel-based subscription service, and the subscription value being proportional to, and being a function of, a duration between the booking date and the travel date, such that the subscription value is a first amount for a first duration between the booking date and the travel date and is a second amount, smaller than the first amount, for a second duration between a second booking date and a second travel date that is shorter than the first duration;
searching a list of the travel services available for reservation that are also available on the travel date to identify candidate travel services each having a cost that corresponds to the computed subscription value, each of the identified candidate travel services having a predetermined travel duration;
training a machine learning technique to process training data comprising data associated with one or more users, the training being performed by:
retrieving a portion of the training data from a storage device;
extracting features from the training data for the one or more users;
utilizing the machine learning technique to estimate an attribute for the one or more users based on the extracted features; and
updating parameters of the machine learning technique based on the estimated attribute for the one or more users;
identifying, based on an output of the machine learning technique comprising the estimated attribute, a subset of the identified candidate travel services;
receiving input from the subscriber that selects a given travel service from the subset of identified candidate travel services; and
in response to receiving the input from the subscriber, presenting an option to extend the predetermined travel duration of the given travel service.

\* \* \* \* \*

UNITED STATES PATENT AND TRADEMARK OFFICE
CERTIFICATE OF CORRECTION

| | |
|---|---|
| PATENT NO. | : 11,263,559 B2 |
| APPLICATION NO. | : 16/667217 |
| DATED | : March 1, 2022 |
| INVENTOR(S) | : Handler et al. |

It is certified that error appears in the above-identified patent and that said Letters Patent is hereby corrected as shown below:

In the Claims

In Column 33, Line 38, in Claim 3, after "comprising:", insert a linebreak

In Column 33, Line 41, in Claim 3, after "service", insert --;--

In Column 34, Line 35, in Claim 12, after "comprising:", insert a linebreak

In Column 34, Line 40, in Claim 12, after "and", insert a linebreak

In Column 35, Line 37, in Claim 18, delete "compute" and insert --computed-- therefor Signed and Sealed this
Twenty-fourth Day of May, 2022

Katherine Kelly Vidal
*Director of the United States Patent and Trademark Office*